UNITED STATES PATENT OFFICE.

ARCHIBALD L. BROWN, OF CHICAGO, ILLINOIS.

COLORED FLASHED ORNAMENTAL GLASS.

SPECIFICATION forming part of Letters Patent No. 584,107, dated June 8, 1897.

Application filed November 27, 1896. Serial No. 613,645. (No specimens.)

*To all whom it may concern:*

Be it known that I, ARCHIBALD L. BROWN, a citizen of the United States, residing in Chicago, in the county of Cook and State of Illinois, have invented a new and useful Improvement in Colored Flashed Ornamental Glass, of which the following is a specification.

My object in this invention has been to produce a very attractive effect in ornamental glass, adaptable especially for use in doors, transoms, office-partitions, and for decklights, signs, &c., and which shall be quite inexpensive as compared with the ornamental colored flashed glass now commonly used for these purposes. The expense of manufacturing the ordinary colored flashed glass and the expense of grinding or etching away such parts as are not wanted to produce an ornamental effect have been so great heretofore as to prevent use of it in many cases where it would otherwise be used.

In the manufacture of my improved ornamental glass I take the clear glass and change it into what is commonly known as "ground" glass, preferably by subjecting its surface to the action of a sand-blast. I then coat or cover the surface which has been ground, as such surface makes the color coating adhere very tenaciously thereto, with a fluid coloring mixture containing gutta-percha, gum, and coloring-matter in solution and adapted to be dried and hardened by continued low heat or baking without injury to the color. After the coating has been applied the glass so prepared is placed in an oven and subjected to heat for a sufficient length of time to thoroughly dry or bake the coating, using in so doing a temperature which will not affect the color of the coating. With some colors I find three or four hours' application of the heat is sufficient, but a greater or less time may be employed. At the conclusion of the baking the coating will be found so hard that it will withstand hard rubbing and cannot be easily scratched or defaced. It will give the sheet of glass a beautiful color effect, but slightly, if any, inferior to the best colored flashed glass having the color fused or incorporated into it, and it cannot be etched with acid, as is commonly done with the ordinary colored flashed glass.

Having now obtained my inexpensive improved colored flashed glass, I now protect the parts of the colored flashed side which I do not wish ground away with a resistant adapted to withstand the action of the sandblast and pass the glass so prepared under the sand-blast, which readily grinds away such parts as are not protected by said resistant. Then the resistant is washed off, and the result is an ornamented colored flashed glass of a beautiful color and design.

I am well aware that enamels, vitrifiable colors, &c., have been applied to clear glass and subjected to a degree of heat sufficient to soften the glass and permit the fusing into it of the enamel or vitrifiable color, so as to form one homogeneous body of color and glass. I do not fuse the glass at all, but simply form a mechanical attachment between the color and the glass. The color used by me is not an enamel or vitrifiable color such as is ordinarily used in the manufacture of flashed, enameled, or stained glass, and the heat used in applying it is continued for a considerable length of time, whereas with the enamels or vitrifiable colors formerly used the operation is complete as soon as the fusing-temperature has been reached.

I claim—

The process of producing colored flashed ornamental glass, consisting in grinding the surface of the clear glass, then flowing over the ground surface a fluid coloring mixture containing gutta-percha, gum, and coloring-matter in solution, then baking the colored coating mixture onto the glass by continuous application of low heat, then covering the parts of the colored flashed side which are not to be cut away with a resistant, then cutting away the parts not protected by the resistant, then washing off the resistant, substantially as specified.

ARCHIBALD L. BROWN.

Witnesses:
H. M. MUNDAY,
EDW. S. EVARTS.